United States Patent [19]

Okino et al.

[11] Patent Number: 4,734,777
[45] Date of Patent: Mar. 29, 1988

[54] IMAGE PICK-UP APPARATUS HAVING AN EXPOSURE CONTROL DEVICE

[75] Inventors: Tadashi Okino, Tokyo; Shinji Sakai, Kanagawa, both of Japan

[73] Assignee: Canon Kabushiki Kaisha

[21] Appl. No.: 57,716

[22] Filed: Jun. 1, 1987

Related U.S. Application Data

[63] Continuation of Ser. No. 558,769, Dec. 6, 1983, abandoned.

[30] Foreign Application Priority Data

Dec. 7, 1982 [JP] Japan .................. 57-214408
Mar. 31, 1983 [JP] Japan .................. 58-56217
Apr. 7, 1983 [JP] Japan .................. 58-61882
Apr. 20, 1983 [JP] Japan .................. 58-70589

[51] Int. Cl.$^4$ .................. H04N 5/238; G03B 7/00
[52] U.S. Cl. .................. 358/228; 358/213.13; 358/213.19; 354/270
[58] Field of Search .............. 358/228, 213.19, 213.13; 354/270; 352/141

[56] References Cited

U.S. PATENT DOCUMENTS

| 4,327,378 | 4/1982 | Tanaka et al. | 358/228 |
| 4,382,267 | 5/1983 | Angle | 358/213 |
| 4,396,951 | 8/1983 | Tanaka | 358/228 |
| 4,556,912 | 12/1985 | Yamanaka et al. | 358/228 X |
| 4,563,705 | 1/1986 | Oinoue et al. | 358/213 X |
| 4,584,610 | 4/1986 | Mizokami et al. | 358/228 |
| 4,635,123 | 1/1987 | Masunaga et al. | 358/213.19 |

FOREIGN PATENT DOCUMENTS 1176179 8/1964 Fed. Rep. of Germany ...... 358/228

Primary Examiner—James J. Groody
Assistant Examiner—E. Anne Faris
Attorney, Agent, or Firm—Toren, McGeady & Associates

[57] ABSTRACT

In an image pick-up apparatus, an image pick-up arrangement converts an object image into electrical signals, a light metering portion other than the image pick-up arrangement detects the brightness of the object image, and a diaphragm regulates the amount of light reaching the image pick-up arrangement. A control controls the aperture value of the diaphragm in response to the output of the image pick-up arrangement and the output of the light metering portion.

60 Claims, 17 Drawing Figures

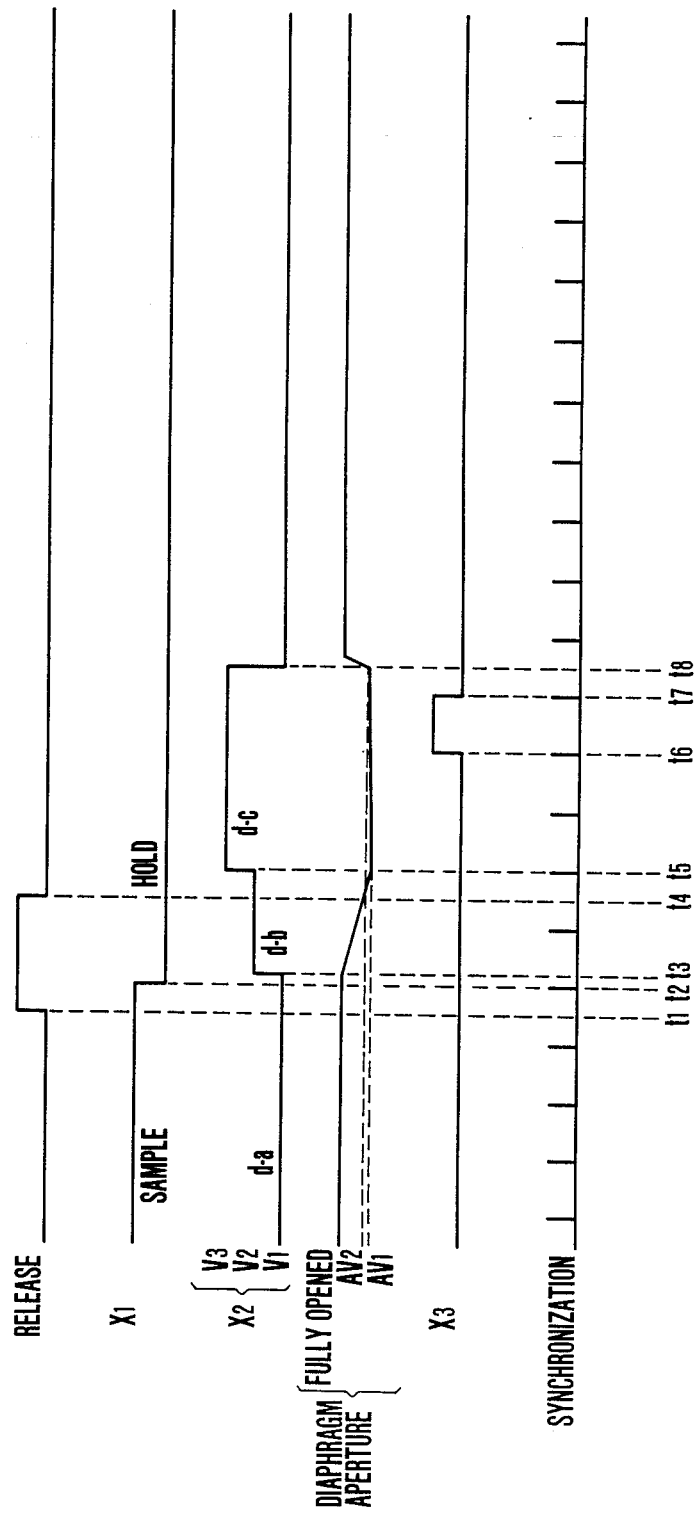

F I G.12
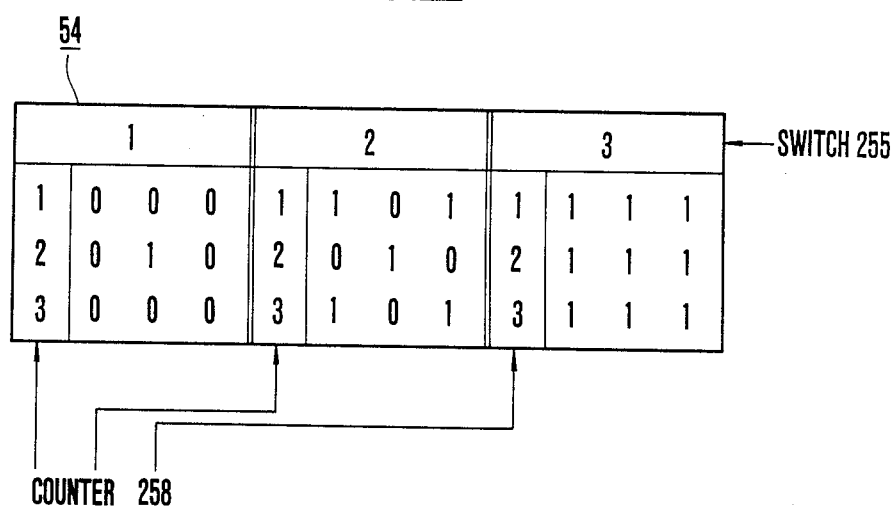
F I G.13(a)   F I G.13(b)   F I G.13(c)
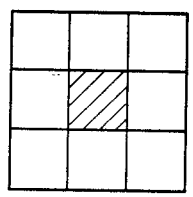   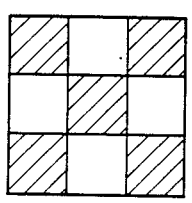   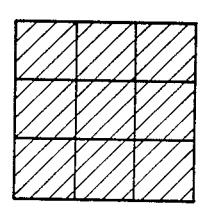

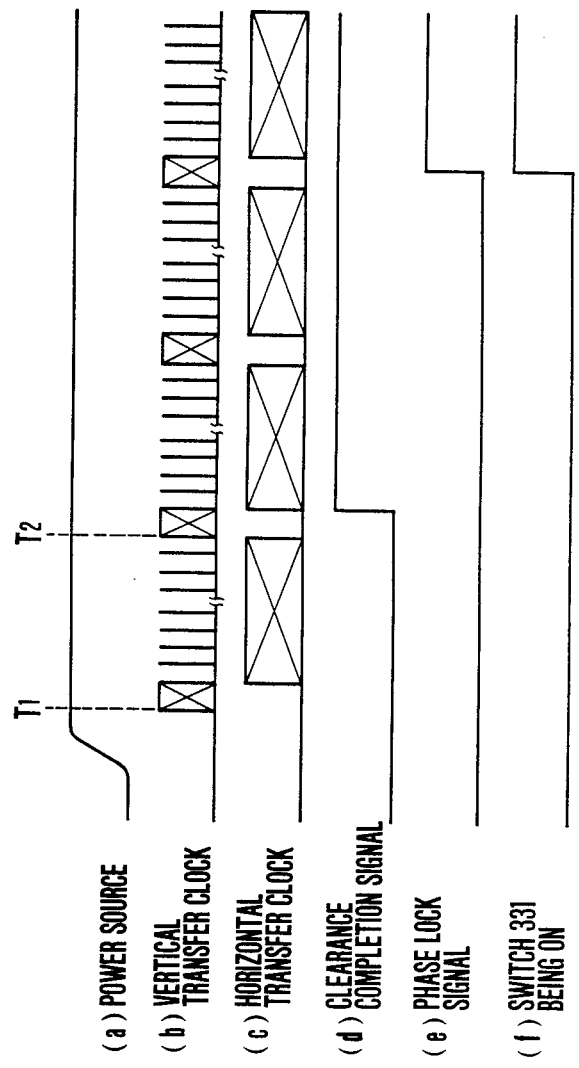

IMAGE PICK-UP APPARATUS HAVING AN EXPOSURE CONTROL DEVICE

This is a continuation of application Ser. No. 558,769, filed Dec. 6, 1983, now abandoned.

BACKGROUND OF THE INVENTION

1. Field of the Invention

This invention relates to an image pick-up apparatus for converting an optical image into electrical signals, and particularly to an image pick-up apparatus having an exposure control device for automatically controlling the amount of an exposure.

2. Description of the Prior Art

Hitherto, for movie photography, use has been made of so-called auto-irises to detect the level of the video signal obtained by the system's image pick-up arrangement for controlling the aperture value of a diaphragm. Because an output signal from the image pick-up arrangement is used, such a system can control exposures with a high level of accuracy.

Recently, technological advances in semi-conductors and progress in magnetic recording technology have resulted in development of solid-state image pick-up elements such as CCD's, BBD's, etc., and in proposals for image pick-up apparatuses for still pictures. However, during still photography, if an exposure control is not accomplished quickly, a photographer will miss the opportunity for shooting pictures. Thus, it is desirable to perform continuous auto-iris operations. This increases the system's power consumption and decreases portability. To overcome these problems, it may be possible to use an arrangement with a power switch separate from a release switch. However, this lengthens the time from the closing of the power switch until stabilization of an image pick-up element and a signal processing circuit for securing an appropriate aperture value. It also increases the length of time required to drive a diaphragm to its appropriate aperture value when the original aperture value deviates significantly from the ultimate value. On the other hand, external light metering elements, such as SPC's, etc., are used for light metering in conventional cameras using silver salt films. This permits a simple arrangement to accomplish a rapid control. However, such a system is disadvantageous with respect to exposure control accuracy when compared with a system using video output signals of an image pick-up arrangement.

Such apparatuses have conventionally been known as having an optical viewfinder for obtaining a clear clean viewfinder image in an image pick-up apparatus for a video camera etc. However, the viewfinder's optical element must be placed to the rear of the diaphragm in order to allow interchange of lenses in such image pick-up apparatuses.

This is so because it is difficult to exercise aperture control accurately unless the position of the diaphragm is in the middle of an image pick-up optical system. Furthermore, if the viewfinder's optical element is provided in front of a diaphragm, mounting an interchangeable lens on a video camera requires the image pick-up optical axis in the interchangeable lens and the optical axis in the viewfinder to match each optical axis in the video camera precisely. This is very difficult to achieve.

This problem can be solved by locating the viewfinder in the rear of the diaphragm. However, in that case, a photographer will be viewing the object through a viewfinder with light passing through an actually stopped down diaphragm. This may darken the field of vision considerably. Hence, this arrangement is disadvantageous for composing the picture and for range finding. Opening the diaphragm fully before picking up an image and stopping it down at the start of image pick-up can go far toward eliminating this difficulty.

However, the dynamic ranges of image pick-up devices such as image pick-up tubes or CCD's, etc., are such that they often cannot function adequately with light passing through a fully opened diaphragm. Hence, light sensing with an ordinary pick-up device in an auto-iris arrangement or such becomes almost impossible.

SUMMARY OF THE INVENTION

It is an object of the present invention to provide an image pick-up apparatus which can solve the disadvantage of the prior arts as mentioned above.

More specifically, the object of the present invention is to provide an image pick-up appatatus having an exposure control system using an image pick-up output of image pick-up means and an exposure control system using a light metering element other than the image pick-up means.

It is another object of the present invention to provide an image pick-up apparatus having an exposure control device which can perform rapid exposure control with a high level of accuracy.

A further object of the present invention is to provide an image pick-up apparatus which can make an optimum exposure control both in still photo-taking and in moving photo-taking.

Also it is an object of the present invention to provide an image pick-up apparatus which can make a fully open light metering and further can make an exposure control by an image pick-up output of image pick-up means when combined with an optical view finder.

Still another object of the present invention is to provide an image pick-up apparatus which can memorize a light metering value before photo-taking and can perform an action for effecting an exposure control with a light metered value memorized at the time of an actual photo-taking (called an AE lock) with a satisfactory accuracy and in a rapid manner.

Other objects of the present invention will be made clear from the drawings and the detailed description to be given below.

BRIEF DESCRIPTION OF THE DRAWINGS

FIG. 7 shows an operational timing diagram for FIG. 6.

FIG. 12 shows an embodiment of a reference table of ROM.

FIGS. 13(a) to 13(c) are diagrams to show light metering modes as corresponding to read out outputs of said ROM.

FIG. 15 is an operational timing diagram of the embodiment shown in FIG. 14.

DETAILED DESCRIPTION OF THE PREFERRED EMBODIMENTS

Figure 1:
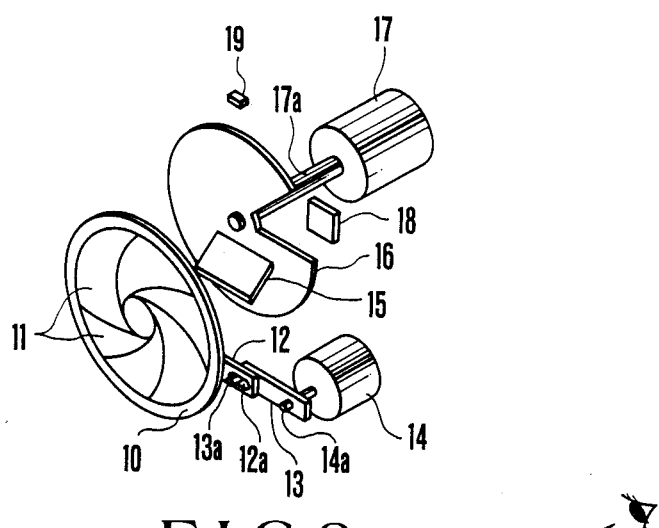
FIG. 1 is an oblique exploded view of a portion of a still picture view camera embodying the present invention.

FIG. 1 is an oblique or perspective view of a portion of a still picture video camera to which the present invention can be applied. In this Figure, 10 is a diaphragm ring, 11 shows diaphragm blades, 12 is a protruding member fixed to the ring 10 and has an elongated slot 12a. In addition, 13 is a diaphragm control arm and has a pin 13a, and 14 is a diaphragm driving motor with a driving shaft 14a being fixed to the control arm 13. 15 is a half-mirror, 16 is a shutter blade, and 17 is a shutter driving motor with a driving shaft 17a being fixed to the shutter blade 16. Further 18 is a frame transfer type CCD, and 19 is a light metering element which has wider dynamic range than that of the CCD 18 and a faster response characteristic than that of the CCD 18, and, for example, a silicone photo-cell (SPC), etc., is used therefor.

The driving force of the diaphragm driving motor 14 is transmitted through the control arm 13, the pin 13a and the elongated slot 12a to the protruding member 12 for rotating the diaphragm ring 10. Rotation of the diaphragm ring 10 drives the diaphragm blades 11 for controlling an aperture area. The object light passing through the diaphragm aperture has a portion thereof projected onto the light metering element 19 by the half-mirror 15 and is imaged on a surface of the CCD 18. The motor 17 drives the shutter blade 16 so it rotates at, for example, 3600 rpm. to prohibit impingement of the object light onto the CCD 18 during the transfer of the CCD 18 and prevent generation of a smear.

Figure 2:
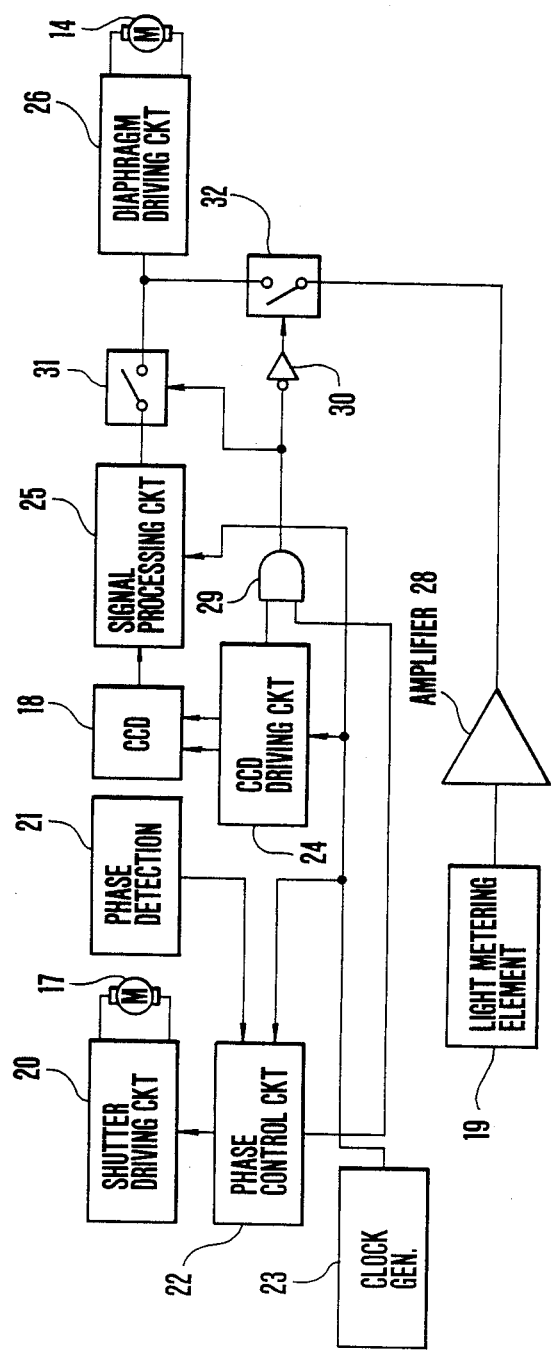
FIG. 2 is a control circuit diagram.

A first embodiment of a circuit suitable for controlling the mechanism is shown in FIG. 2.

In FIG. 2, is a shutter driving circuit, 21 is a phase detection circuit for the motor 17, 22 is a phase control circuit, and 23 is a clock generator. Also, 24 is a CCD driving circuit, 25 is a signal processing circuit, 26 is a diaphragm driving circuit to control the diaphragm motor 14. Further 28 is an amplifier, 29 is an AND gate, 30 is an inverter, and 31, 32 are analog switches.

The circuit operation of FIG. 2 will be explained by referring to the time chart shown in FIG. 3.

When a power source (not shown) is turned on by a power source switch (not shown), the power is supplied to each part in FIG. 2. An output clock of the clock generator 23 is supplied to the phase control circuit 22, the CCD driving circuit 24 and the signal processing circuit 25. The phase control circuit 22 sends a phase error signal to the shutter driving circuit 20 in response to an output signal of the phase detection circuit 21 and the output clock of the clock generator 23, for controlling the phase of the motor 17, and at the same time applies a phase lock signal (FIG. 3(e)) to one of the input terminals of the AND gate 29 when the phase thereof matches.

Figure 3:
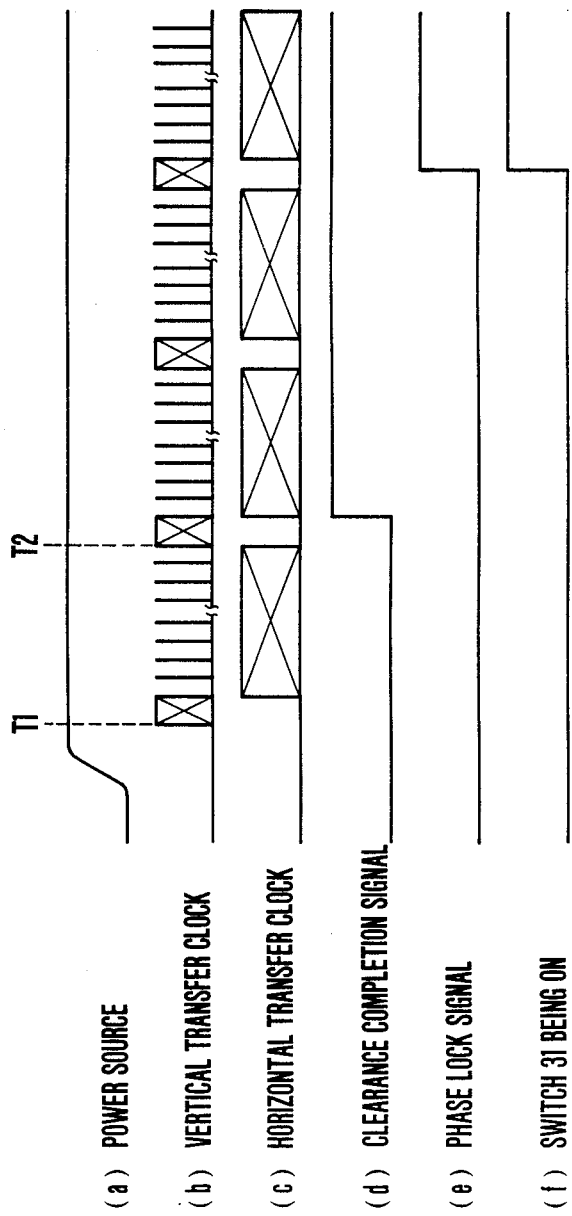
FIG. 3 shows an operational timing diagram for each part of FIG. 2.

Also, the CCD control circuit 24 sends a signal for instructing the pick-up part of the CCD 18 to store an image pick-up charge, a vertical transfer clock (FIG. 3(b)) and a horizontal transfer clock (FIG. 3(c)) for reading out an image pick-up charge, to the CCD 18. And between the time T1 and the time T2 shown in FIG. 3, unnecessary charge of the image pick-up part is sent to a store part by the vertical transfer clock, further it is sent out to outside by the horizontal transfer clock. Then, as the clearance of the unnecessary charge is completed and the next read out by the horizontal transfer clock is started, the driving circuit 24 applies a clearance completion signal (FIG. 3(d)) to the other one of the input terminals of the AND gate 29. The output signal of the AND gate 29 (FIG. 3(f)) will have a high level due to outputs of both of said clearance completion signal and the phase lock signal mentioned above.

Therefore, before that, the analog switch 32 is closed by the output of the inverter 30 and a light metering signal having the output of the light metering element 19 amplified by the amplifier 28 is transmitted to the diaphragm driving circuit 26, thus controlling the aperture area of the diaphragm.

When the output signal of the AND gate 29 goes to a high level, the switch 32 is opened while the switch 31 is closed. And the output of the CCD 18 is transmitted through the signal processing circuit 25 to the diaphragm driving circuit 26, thus controlling the aperture diameter of the diaphragm with the output of the image pick-up means itself.

Since the diaphragm is controlled beforehand to a value close to the correct level by another light metering means other than the image pick-up means before the image pick-up means such as CCD, etc., and the shutter, etc., function normally, the amount of control of the diaphragm by an output of the image pick-up means can be remarkably reduced. Therefore, the control time can be largely shortened. Further, as the diaphragm is controlled finally by using an output of the image pick-up means an exposure control can be achieved with a very high level of accuracy.

Also, with an output of the signal processing circuit 25, a voltage proportionate to a value, such as a weighted sum of a charge level of each picture element of one picture frame, is produced. And, depending on the weighting method, an averaged light metering, a center-weighted light metering, as well as a locally-weighted light metering can be done. Because this since those metering methods are already known, detailed explanations therefor are omitted. Thus a variety of light metering methods can be selected.

Figure 4:
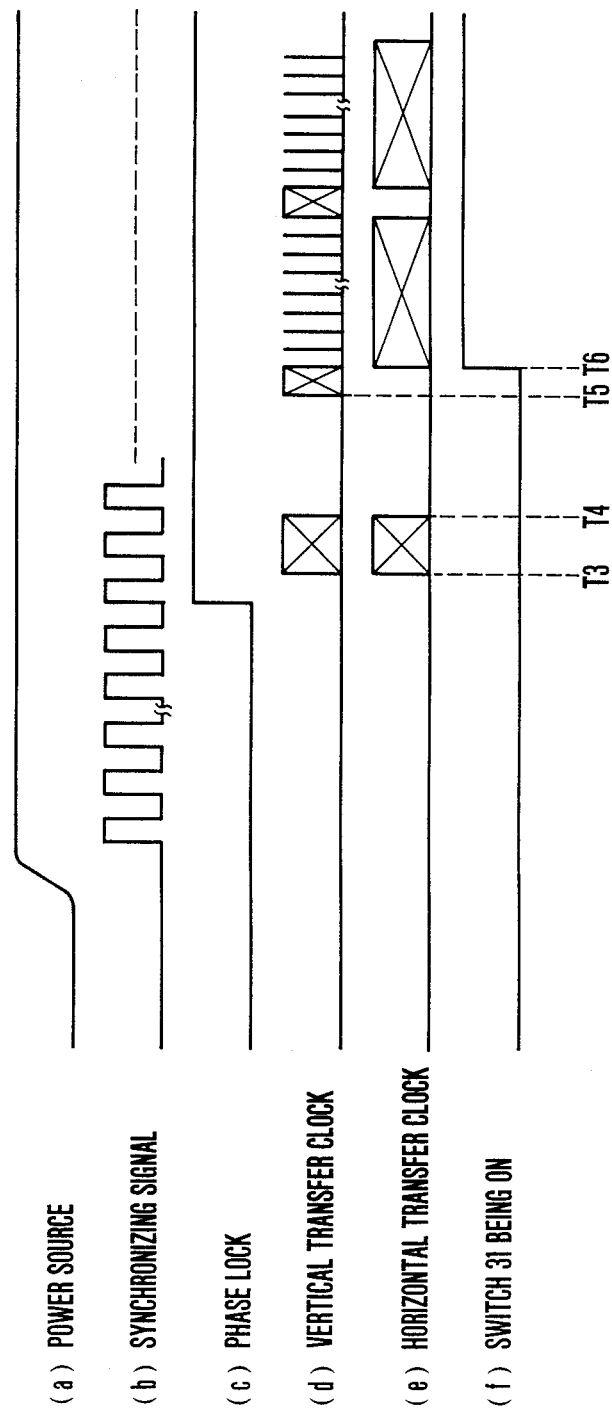
FIG. 4 shows an operational timing diagram for a second embodiment of the present invention.

FIG. 4 shows a time chart of a second embodiment using each circuit element shown in FIG. 2.

In FIG. 4, (a) shows a power source, (b) shows a synchronizing signal impressed to the phase control circuit 22, and (c) shows a phase lock signal, while (d) shows a vertical transfer clock, and (e) shows a horizontal transfer clock, further (f) shows ON signal of the switch 31.

After the power source is turned on, power is first supplied to the shutter driving circuit 20, the phase control circuit 22, the clock generator 23, the diaphragm driving circuit 26, and the amplifier 28, and as such, a phase lock signal is obtained. Then power is supplied to the CCD driving circuit 24 and the signal processing circuit 25. The vertical transfer clock then has a higher frequency than the normal clock frequency and the horizontal transfer clock will be applied to the CCD 18 and removal of unnecessary charge will be done between a time T3 and a time T4, as shown in FIG. 4. Also, between the time T4 and the time T5, shown in FIG. 4, charge is stored at the CCD 18, then the read-out of the stored charge will be performed by the horizontal transfer clock from the time T6 on. At the time T6, the control of the diaphragm driving circuit 26 is changed over from control by an output of the light metering element 19 to control by an output of the signal processing circuit 25. This is because the length of time required for the phase control of a shutter is by far longer than that for the clearance of the CCD, and wasteful power consumption can be eliminated by such an arrangement.

Figure 5:
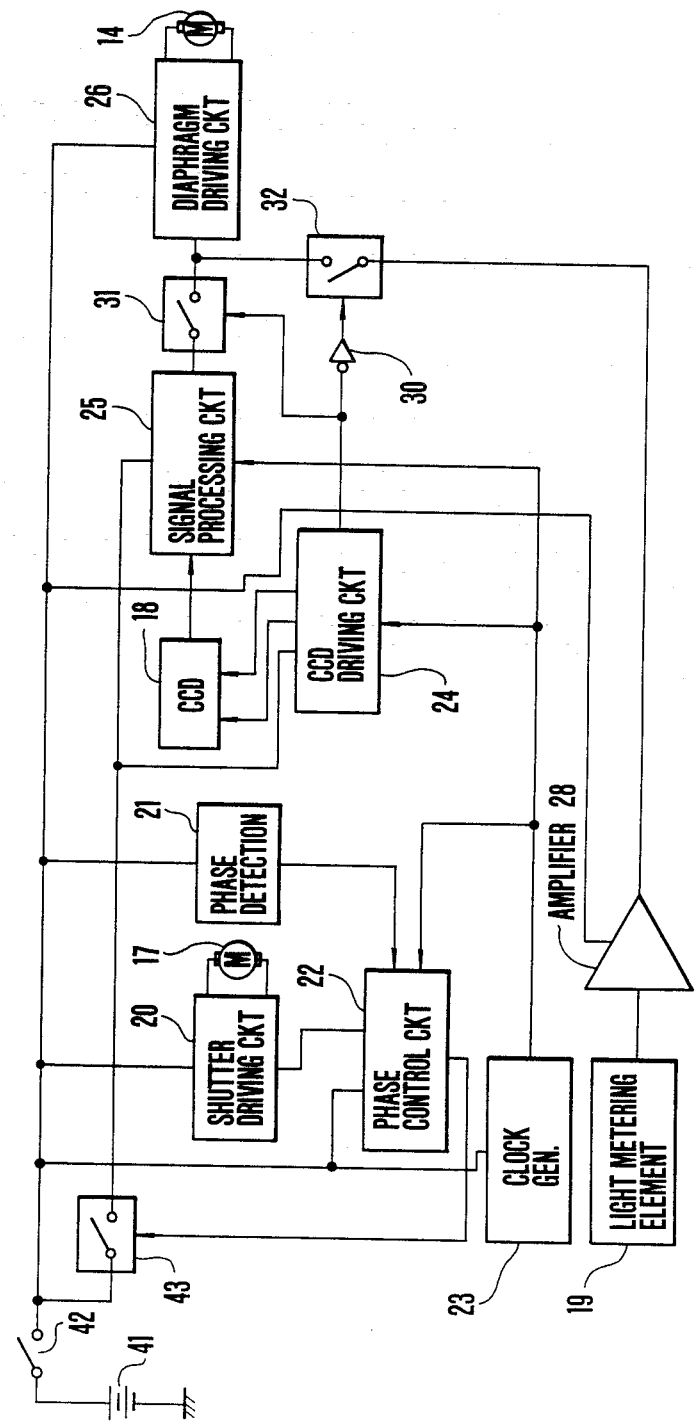
FIG. 5 is a control circuit diagram for the second embodiment.

While a detailed wiring diagram for this embodiment can be realized by any person skilled in the art, an embodiment of the circuit diagram is shown in FIG. 5. In FIG. 5, parts having same functions as those in FIG. 2 are identified with same numbers. In this Figure, 41 is a power source, 42 is a power source switch, and 43 is a power supply switch. As is apparent from the Figure, when the power source switch 42 is closed, power is supplied to the clock generator 23, the shutter driving circuit 20, the phase control circuit 22, the diaphragm driving circuit 26, and the amplifier 28. As a phase lock signal is now produced from the phase control circuit 22, the power supply switch 43 is closed and then power is supplied to the CCD driving circuit 24 and the signal processing circuit 25. The switch 31 is closed while the switch 32 is opened by a clearance completion signal of the CCD 18. Since the power supplied to the CCD driving circuit 24 and the signal processing circuit 25 is delayed, as mentioned above, with respect to the power supplied to the other circuits, wasteful power consumption can be avoided.

Also, while change-over of the light metering means is performed using the phase lock signal and the clear completion signal in this embodiment, the light metering means can be changed over using an output of a timer circuit with the length of time required therefor being taken into consideration. The shutter means does not have to be used when the store time of the CCD is controlled, and change-over of the light metering means can be made only by the clearance completion signal of the CCD, etc., or only by detecting that a heater has been sufficiently warmed when an image pick-up tube is used.

While light metering is done using a half-mirror in this embodiment, as the light metering accuracy by an external light metering element does not have to be very high, it may be positioned in front of the diaphragm.

While a CCD of a frame transfer type is used as the image pick-up means, other types of solid image pick-up element or an image pick-up tube, etc., may be used.

As has been explained, the diaphragm member is controlled to a somewhat correct value by light metering means other than the image pick-up means before the image pick-up means functions normally in the first and second embodiments of the present invention, and the diaphragm member is controlled to an appropriate aperture value by an output of the image pick-up means as the image pick-up means functions normally. By such an arrangement an exposure control with high level of accuracy can result within a short period of time, and an extent of freedom of light metering patterns selectable will become great.

Figure 6:
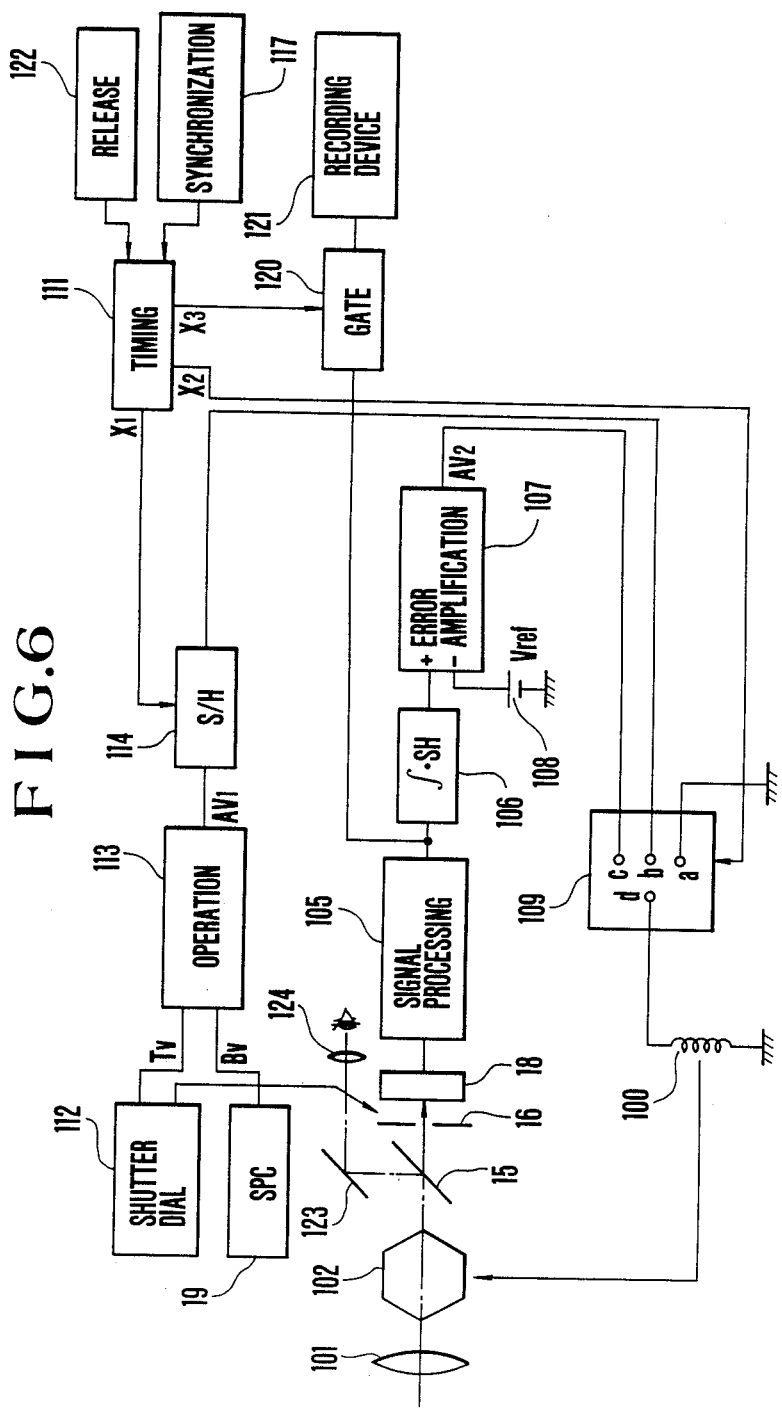
FIG. 6 is a control circuit diagram for a third embodiment of the present invention.

FIG. 6 shows a control circuit diagram of a third embodiment of the present invention.

Parts identified in FIG. 6 with same numbers as those used in FIG. 1 show same elements. 101 is an image pick-up optical system, 102 is diaphragm means made of the diaphragm ring 10 and the diaphragm blades 11, etc., shown in FIG. 1. In addition, 105 is a signal processing circuit to add various corrections to brightness elements and color elements within output signals from the CCD 18. 106 is an integration circuit to intergrate brightness signals suitably formed at the signal processing circuit 105 and to sample hold the same for each field. Further, 107 is an error amplification circuit for comparing an output of the integration circuit 106 with an electric potential Vref of a prescribed reference voltage source 108, and for introducing an error signal thereof into a switch circuit 109. The switch 109 has a common contact "d" and three change-over contacts "a", "b" and "c", and connects one of the change-over contacts with the common contact depending on the level of a control output X2 of a timing signal forming circuit 111 to be explained below. 100 is a diaphragm driving coil connected to the common contact d for driving the diaphragm 102 in a manner the larger a voltage level impressed to the common contact "d", the more the diaphragm 102 is stopped down.

When current does not flow to the coil 100, that is when the contact "d" is connected to the contact "a", the diaphragm 102 is in a fully opened state. 112 is a shutter time setting circuit such as a shutter dial to designate an opening angle at the rotary shutter 16 that is a shutter time Tv. In addition, 113 is an operation circuit to operate said shutter time Tv and an output of the light metering element 19, that is, brightness information Bv, thereby producing aperture information AV1. 114 is a sample hold circuit serving as memory means for sampling the operation output AV1 with a timing of a control output X1 of the timing signal forming circuit 111 to be explained below and memorizing the same. Further, 120 is a gate circuit and 121 is a recording device, wherein the gate circuit 120 has its opening time duration and the timing thereof controlled by a control output X3 of the timing signal forming circuit 111.

The timing signal forming circuit 111 functions as control means for the diaphragm 102 and receives an output of a release circuit to form a release signal as well as an output of a synchronizing circuit 117 to form a synchronizing signal, respectively, and produces such control outputs X1, X2 and X3, as shown in FIG. 7. Also in this embodiment, there is a half-mirror 123 to guide a portion of light reflected by a half-mirror 15 to a view finder optical system 124. The operation of the circuit shown in FIG. 6 is more easily understood by referring to the timing chart.

When a release button (not shown) is pressed at the time t1 after a power source switch (not shown) is turned ON, pulses with a prescribed time duration are produced from the release circuit 122.

Since the output X1 of the timing signal forming circuit 111 goes to a low level at the time t2 immediately thereafter, the aperture value AV1, derived from the output Bv of the SPC 19 and the preset shutter time Tv in the operation circuit 113 is held at the time t2.

Also, since the level of the control output X2 has been at V1 until this stage, the diaphragm 102 is in a fully opened state. Therefore, the view finder provides a bright view so that focus adjusting and setting of the composition can be easily made.

Further, since the control output X2 produced from the timing signal forming circuit 111 at the time t3 immediately after the aperture value AV1, is held becomes to have a level V2, as shown in FIG. 7, the contact "b" of the switch 109 is connected to the contact "d" and the diaphragm 102 is stopped down from the fully opened state toward the aperture value AV1. When a somewhat longer period of time than the longest time necessary for controlling the diaphragm, elapses (time t5), the control output X2 produced by the timing signal processing circuit 111 becomes a level V3 as shown in FIG. 7. Therefore, the contact "d" of the swtich 109 is connected to the contact "c" and the diaphragm 102 is servo-controlled according to the output AV2 of the error amplification circuit 107.

Therefore, the light amount control can be made with a high level of accuracy at this stage. Further, a response will be very fast and there is no fear of missing an opportunity to take a picture. That is, when the diaphragm is servo-controlled with the output AV2 of the error amplification circuit at the time t5, the aperture value has almost reached a target value already by an output of the SPC 19. Therefore, an accurate control of an aperture by a stopped down light metering can be made within a very short time. After that the control output X3 goes to a high level for a period of time corresponding to one frame in synchronism with a synchronizing signal, and the read out output from the CCD 118 is taken to the recording device and is recorded.

Since the control output X2 goes to a level V1 again after that, the aperture is placed in a fully opened state again placing a view finder in a bright condition.

As has been explained above, since a view finder optical system is provided for light having already passed through a diaphragm in this embodiment, exchange of an image pick-up lens can be made easily, yet a light metering element with a wide dynamic range is provided separately in this case for light metering the light through the diaphragm. Therefore, light metering can be made while looking through the view finder in a fully opened state. This constitutes a great special advantage over conventional video cameras wherein the dynamic range of the image pick-up means is narrow and a light metering with a fully opened aperture cannot be made.

That is, according to an arrangement of this embodiment, since a light metering with a fully opened aperture is possible, the view finder provides a bright view, yet a rapid control can be made to secure an aperture value corresponding to the light metering value concurrently with a start of an image pick-up.

As has been explained above, according to the third embodiment of the present invention, the aperture value is memorized by light metering means having a wider dynamic range than that of image pick-up means before an image pick-up, and the diaphragm 102 is driven to the aperture value along with the start of image pick-up, then after that, the aperture is readjusted by an output of the image pick-up means. Therefore a light metering with a very high level of accuracy can be made as compared with a case when only an SPC is used as in a conventional camera using a silver salt film. Further, since memory means to once memorize an output of light metering means is provided and an auto-iris is driven to the memorized value, there will be many advantages such as fast rising (leading), etc.

Figure 8:
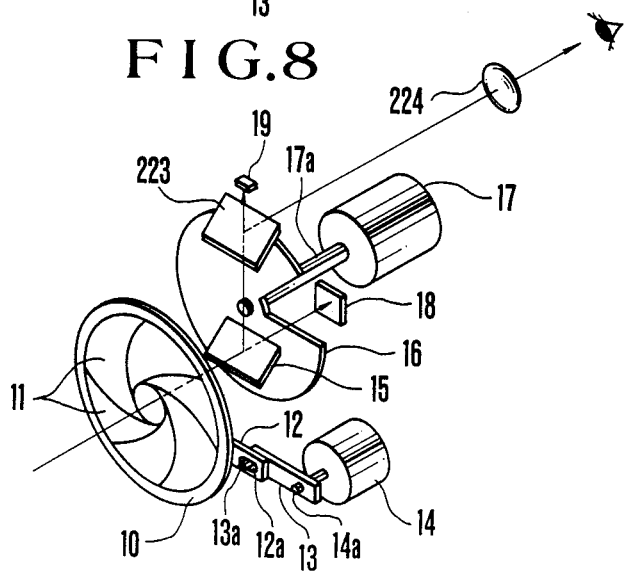
FIG. 8 is an oblique exploded drawing of an embodiment of an important part of an image pick-up apparatus having an optical view finder.

FIG. 8 is an oblique view to show an important part of an optical system including a view finder optical system. In this drawing, parts having some functions as that in FIG. 1 are identified with same numbers. In FIG. 8, 223 is a half-mirror while 224 is an eyepiece lens, constituting a view finder optical system. Light transmitting through the half-mirror 223 is guided to the light metering element 19 and is used for light metering. Also a physical type of aperture control means, for example, liquid crystal, Kerr cell, etc., may be used in place of the diaphragm blades 11.

Figure 9:
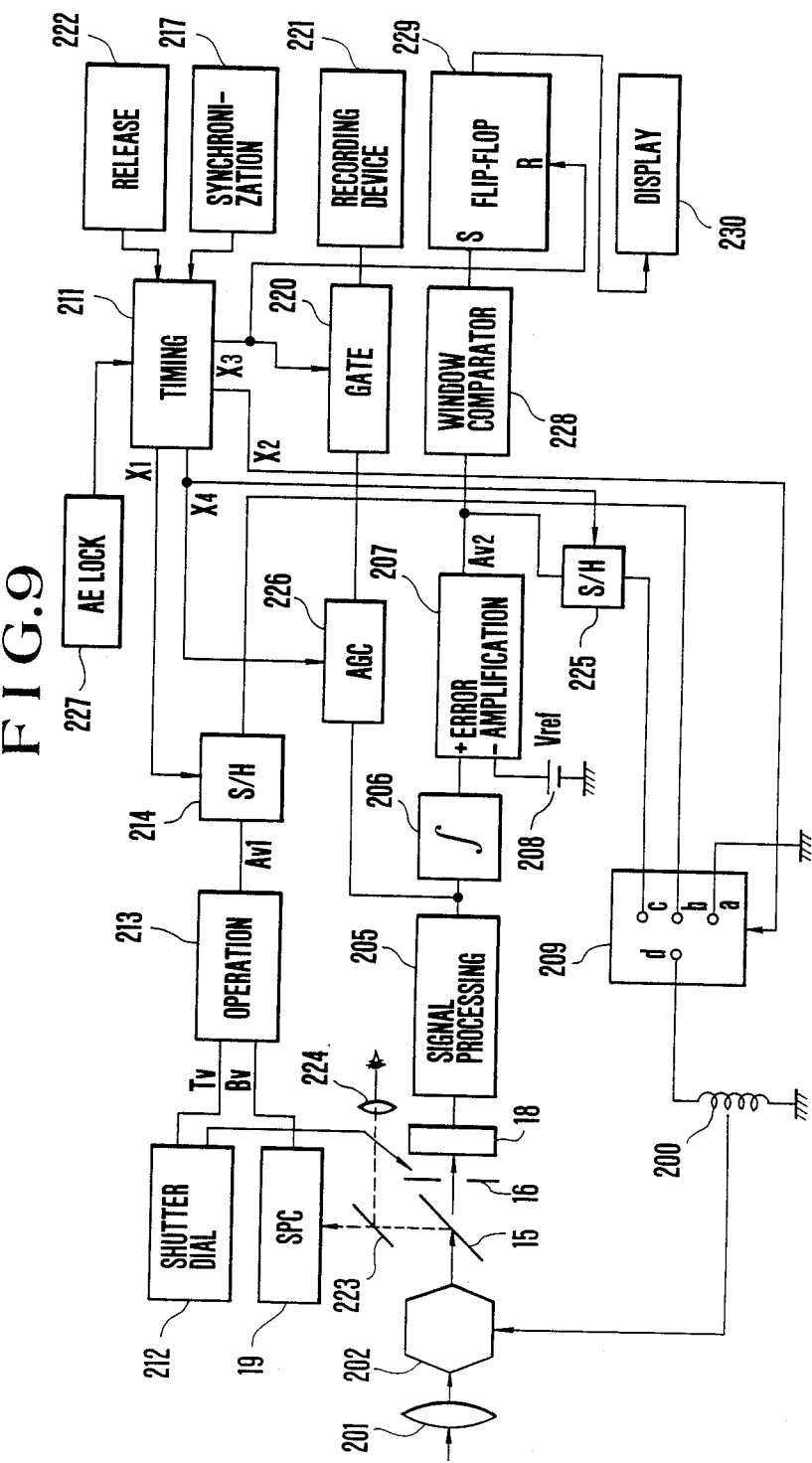
FIG. 9 shows a control block diagram of a fourth embodiment.

FIG. 9 shows a control circuit diagram for a fourth embodiment of an image pick-up apparatus of the present invention.

In FIG. 9 parts with same numbers as those shown in FIG. 8 show same elements. 201 is an image pick-up optical system, and 202 is diaphragm means consisting of the diaphragm ring 10 and diaphragm blades 11, etc., as shown in FIG. 8. In addition, as 205 is a signal processing circuit to give various corrections to brightness elements or color elements within output signals of the CCD 18, and 206 is an integration circuit consisting of, for example, a low-pass filter to integrate brightness signals suitably formed at the signal processing circuit 205. Further 207 is an error amplification circuit for comparing an output of the integration circuit 206 with an electric potential Vref of a prescribed reference voltage source 208, and for introducing an error signal thereof into a switch circuit 209 through a sample-and-hold circuit 225 as second memory means.

The switch circuit 209 has a common contact "d" and three change-over contacts "a", "b" and "c" and connects one of the change over contacts with the common contact depending on the level of a control output X2 of a timing signal forming circuit 211 to be described below. 200 is a diaphragm driving coil connected to the common contact to drive the diaphragm 202 in a manner as the larger a voltage level impressed to the common contact "d", the more the diaphragm 202 is stopped down.

Figure 10:
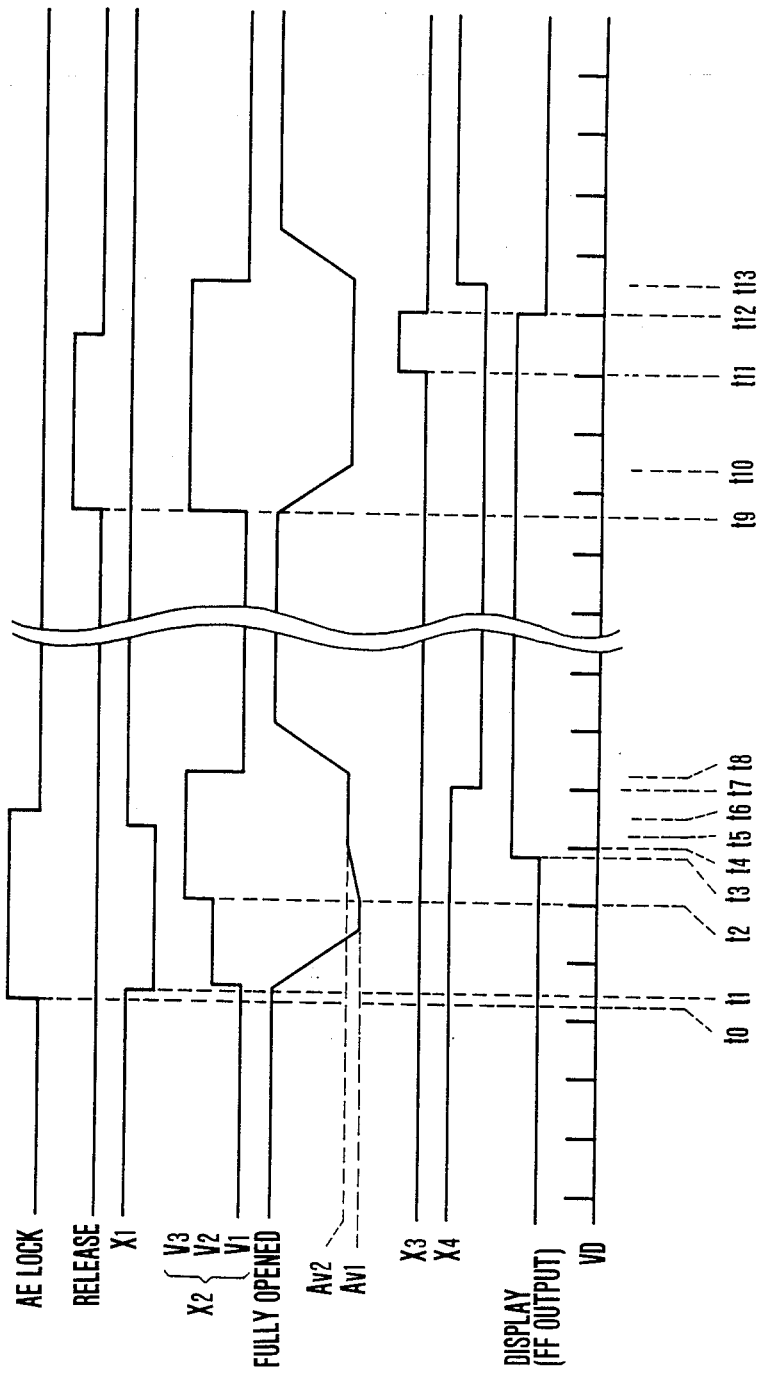
FIG. 10 is an operational timing diagram of the circuit shown in FIG. 9.

Also, when current does not flow to the coil 200, the diaphragm is in a fully opened state. 212 is a shutter time setting circuit for designating an opening angle at the rotary shutter 16, that is a shutter time Tv. In addition 213 is an operation circuit for producing aperture information AV1 by operating on the shutter time Tv and an output of the light metering element 19, that is brightness information Bv. Further, 214 is a sample-and-hold circuit serving as first memory means to sample said operational output Av1 with a timing of a control output X1 of the timing signal forming circuit 211 to be described below, and to memorize the same. 226 is an automatic gain control amplifier (hereinafter called as AGC) to perform a gain control operation so that a level of brightness signal, etc., obtained through the signal processing circuit 205 becomes constant while an output signal X4 of the timing signal forming circuit 211 is at a high level, and so that when the signal X4 drops down to a low level, a state of gain at the dropping time of the signal X4 is retained. 220 is a gate circuit and 221 is a recording device, and the gate circuit 220 has its opening time duration and timing thereof controlled by a control output X3 of the timing signal forming circuit 211. The timing signal forming circuit 211 functions as control means for a diaphragm and receives an output of a release circuit 222 for forming a release signal, an output of a synchronizing circuit 217 for forming a synchronizing signal, and an output of an AE lock circuit 227, respectively, and produces the control outputs X1 to X4 as shown in FIG. 10.

A window comparator 228 detects whether an output level of the error amplification circuit 207 is within a prescribed fine range, and when the input level is within the fine range, it sets a flip-flop circuit (hereinafter called as FF) 229 to make an output of the FF 229 have a high level. During the period when the FF 229 shows a high level, a display circuit 230 displays the same with sound or light.

Also, the FF 229 is reset in synchronism with dropping of the output X3 of the timing signal forming circuit 211 to a low level and the output of the FF 229 goes to a low level and the display disappears.

Further, the window comparator 228 may be one having some time constant or hysteresis to prevent hunting.

Operations of the circuit shown in FIG. 9 are explained based on the timing chart shown in FIG. 10.

When an AE lock button (not shown) is pressed for a time after a power source switch (not shown) is turned ON, a high level signal is produced by the AE lock circuit 227 during the time the button is pressed.

Because the output X1 from the timing signal forming circuit 211 immediately falls the rise of the AE lock signal, an aperture value AV1, derived from the output Bv of the SPC 19 and the preset shutter time Tv by the operation circuit 213, is held by the circuit 214.

As the level of the control output X2 has been at V1 until this stage, the diaphragm 202 is fully opened. Therefore, the view finder provides a bright view so that focus adjustment and a setting of composition, etc., can be made easily.

Also, since the control output X2 produced from the timing signal forming circuit 211 at a time t1, immediately after the aperture value AV1 is held, goes to a level V2 as shown in FIG. 10, the contact "b" of the switch 209 is connected to the contact "d" and the diaphragm 202 is stopped down from the fully opened state toward the aperture value AV1. When a somehwat longer time than the longest time necessary for the diaphragm control has elapsed (time t2), the control output X2 produced by the timing signal forming circuit 211 goes to a level V3 as shown in FIG. 10. Therefore, the contact "d" of the switch 209 is connected to the contact "c" and the diaphragm 202 will be servo-controlled according to an output of the error amplification circuit 207.

Therefore, at this stage, the diaphragm 202 will control the light volume with a high level of accuracy. However, the response thereof is very fast, thus, there is no fear of missing an opportunity for taking a picture.

That is, since the aperture value has almost reached a target value already by an output of the SPC 19, when the servo-control of the diaphragm 202 is started by an output of the error amplification circuit 207 at the time t2, the diaphragm control by exact stopped down photo-sensing can be achieved in a very short period of time (time t2 to t4). When the diaphragm 202 is servo-controlled by the output AV2 of the error amplification circuit 207 and the taget value AV2 is almost reached (time t3), a high level output is produced from the window comparator 228, and an operator will be informed by the display circuit 230 that the AE lock has been completed.

Also, the control output X1 goes to high again, for example, at a time t5 after the control output X2 goes to a level V3.

Further, when the length of time necessary for the AGC 226 to stabilize elapses after the aperture reaches the target value AV2, the control output X4 goes to a low level in synchronism with a vertical synchronizing signal VD (time t7). By this the gain of the AGC 226 and the output of the sample-and-hold circuit 225 will be held at a level of the time t7. Also, the above-mentioned FF 229 may be so arranged as being set at this time t7. The control output X2 returns to the level V1 again at a time t8 immediately thereafter, and the switch circuit 229 has, thereby, its common contact "d" and change-over contact "a" connected together.

Therefore, the diaphragm 202 is placed in a fully opened state again, that is, a state suitable for a new object, and composition setting of a new picture frame is obtained.

After that, when a release button (not shown) is pressed at a suitable timing (time t9), the control output X2 reaches a level V3, and by this, current, according to the aperture control value V2 which has been held until then, flows to the driving coil 200 and the diaphragm 202 will be stopped down directly to an aperture value corresponding to the aperture control value AV2.

After that, when a somewhat longer period of time than the longest time necessary for a control of the diaphragm 202 has elapsed, the control output X3 goes to a high level for one field period or one frame period (time t11 to t12) in synchronism with a vertical synchronizing signal from the synchronizing circuit 217, and the output from the AGC 226 with a fixed gain is applied to the recording device 221.

With the recording completed the flip-flop 229 is reset at the fall edge of the control output X3 (time t12), and the AE lock displayed by the display circuit 230 is terminated.

After that, at the same time the control output X2 goes to the level V1 again (time t13) and the diaphragm is fully opened, the AGC 226 will make an ordinary automatic gain control.

In this embodiment since the AE lock is achieved on the basis of the light metering value obtained from a stopped down light metering by image pick-up means instead of an AE lock based on a light metering value at a fully opened aperture state, a very accurate AE lock can be achieved.

Further, according to the fourth embodiment of the present invention, as has been explained, the light metering is done by an SPC or CdS, etc., having relatively wider dynamic range in a fully opened state of a diaphragm 202 in an arrangement having a view finder optical system positioned in the rear of the diaphragm, and the light metering is performed by an output of an image pick-up device such as a CCD, image pick-up tube, image sensor of MOS type, etc., with the diaphragm stopped down, the diaphragm 202 can be placed in a fully opened state, as required, for securing a bright view in a view finder.

Also, in order to quickly shift to a stopped down light metering state when an AE lock is done, a fully opened light metering value is memorized and the diaphragm 202 is stopped down first based on said memorized value, therefore the response of diaphragm control will become very quick.

Of course in an apparatus having an inherently fast responding characteristic to a diaphragm, such control by a fully opened light metering value can be omitted.

Further, since display means to display that the diaphragm 202 is stabilized in a stopped down state that is, an AE lock has been completed, is provided in this embodiment, a recording will not be made under an unstable state of a servo-diaphragm.

Also, when this embodiment employs an arrangement that detection is made by the window comparator 228 as to whether the output level of the error amplification circuit 207 comes within a prescribed range for starting display of an AE lock completion, for example, the detection may be made by a timer which produces pulses of high level after an elapse of a prescribed length of time after an AE lock button (not shown) is pressed. In such case, the output of such timer may be introduced into the FF 229 as it is.

Further, since locking of the gain of the AGC 226 and holding of the sample-and-hold circuit 225 are made for returning to a fully opened aperture after an AE lock is done at a stopped down state in this embodiment, a bright view can be obtained at the view finder until a recording is made after the AE lock.

Figure 11:
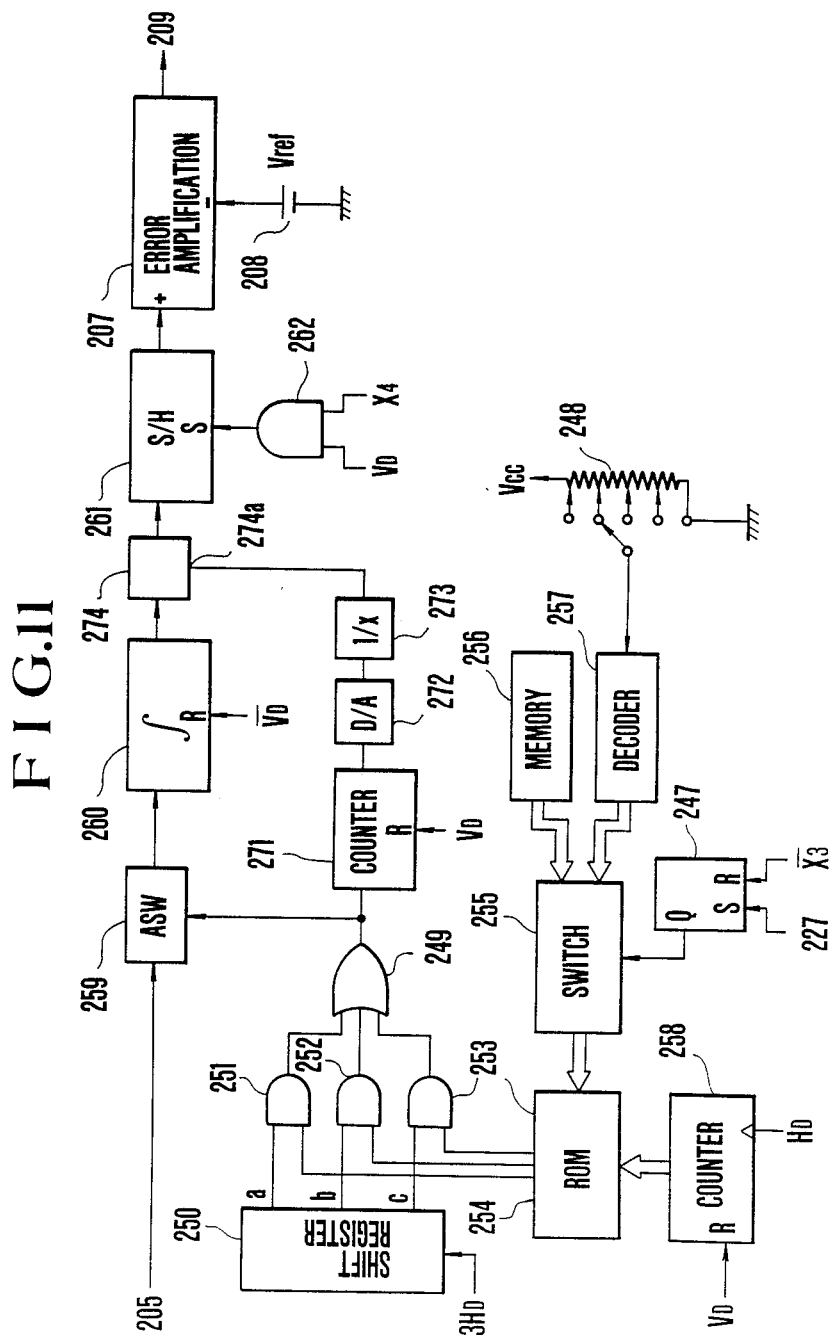
FIG. 11 is a drawing to show another embodiment of an arrangement of the important part of the circuit shown in FIG. 9.

FIG. 11 shows an embodiment in which the integration circuit 206 of the image pick-up apparatus in the embodiment shown in FIG. 9 is further improved.

In FIG. 11, 250 is a shift register to produce pulses with high level in turn from output terminals "a", "b", "c" by clock 3HD with 3 times higher frequency than that of the horizontal synchronizing signal HD, wherein duration of the high level of each output pulse will have, for example, a length of ⅓ of one horizontal period.

In addition, 251 to 253 are AND gates with two inputs, 249 is on OR gate with three inputs, and 259 is an analog switch. 254 is a read-only memory (ROM) and memorizes such data as to be introduced into the AND gates 251 to 253 in a form to be described below. Further, 256 is a memory for block address to designate an address of one memory block prescribed within the ROM 254. Also, 257 is a decoder and is to designate different block addresses depending on output levels of a light metering mode change-over switch 248. 255 is a switch circuit to use one of the outputs of the memory 256, and the decorder 257 selectively for designation of a block address of the ROM 254.

Member 247 is a flip-flop circuit and is set at the vising edge (leading edge) of an output of the AE lock circuit 227, then is reset at the trailing edge of the control output X3 of the timing signal forming circuit 211. The switch 255 is changed over depending on the Q output of the flip-flop circuit 247. That is, it guides the output of the memory 256 to the ROM 254 when the Q output is at a high level, and it guides the output of the decoder 257 to the ROM 254 when the Q output is at a low level. Further, 260 is an integration circuit and is reset by a trailing edge of a vertical synchronizing signal VD shown in FIG. 10. Also, 274 is a gain control circuit. Further, 261 is a sample-and-hold circuit as second memory means according to the present invention and makes sampling by the rise (leading edge) of high level pulses of the AND gate 262 and holds an output of the gain control circuit 274 until next rise of high level pulses is obtained. Further, 271 is a counter connected to an output of an OR gate 249 and counts a total sum of ON time of an analog switch (ASW) 259 and is reset by trailing edge of the VD. An output of the counter 271 is introduced into a D/A conversion circuit 272, an output of which is connected to a gain control terminal 274a of the gain control circuit 274 through a reciprocal circuit 273. An input of the gain control circuit 274 is connected to the integration circuit 260, while an output of the same is introduced into the sample-and-hold circuit 261. By doing so, even when the light metering range within a picture plane varies through an analog switch, an output voltage of the gain control circuit 274 is so controlled as to maintain the same level voltage against an object with the same brightness. The AND gate 262 has the vertical synchronizing signal VD and the control output X4 introduced thereinto.

Therefore, during a period of time when the control output X4 is at high level, an output through the gain control circuit 274 with an integrated value of a preceding field signal is sampled and held for every rise of the VD, and when the X4 is at a low level, the same value is kept being held. 207 is an error amplification circuit as mentioned above, and an output of the error amplification circuit 207 is connected directly to a change-over terminal "c" of the switch 209. As such arrangement is provided, until an AE lock signal is produced from the AE lock circuit, a so-called evaluation light metering using selectively a portion or all of the output of the CCD 18, a center-weighted light metering, balanced light metering or a center spot light metering, etc., can be made. But once an AE lock signal is produced, an automatic change-over will be made to a center spot light metering mode memorized at the memory 256 until a recording is completed.

FIG. 12 serves to explain an arrangement of the ROM 254, and FIGS. 13(a), (b), (c) are diagrams to explain light metering modes such as mentioned above, showing a case in which the CCD consists of 3×3 picture element. Within the ROM 254, for example, there are three blocks having, respectively, 1 to 3 block addresses, wherein each block has respectively, 1 to 3 data addresses. Binary data, such as shown in FIG. 13 is memorized by 3 bits each at each data address, and a prescribed block is designated by an address signal through the switch 255. Then when a prescribed data address is designated by the counter 258, data of 3 bits within the data address will be introduced into the AND gates 251 to 253, respectively. Therefore, if a block address 1 of the ROM 254 shown in FIG. 12 is designated, then data addresses are designated in turn according to a count value of the counter 258. Therefore, only an output of a picture element having oblique hatchings at the center of the CCD of 3×3 picture element, as shown in FIG. 13(a), is guided to the integration circuit 260 through the analog switch 259 and is integrated.

Similarly, when a block address 2 is designated, CCD outputs, shown with oblique hatchings in FIG. 13(b), only will be integrated, and when a block address 3 is designated, outputs of the oblique hatching part of FIG. 13(c), that is, the total CCD, will be integrated. Of course, if the number of data addresses within each block is made to be about 252, as an example, weighting against outputs of total horizontal lines of the CCD 18 can be made. Also, when the number of blocks are increased, the number of light metering modes can be increased that much. Of course, as the number of data addresses within each block increases, the kind of light metering modes can be more varied.

As explained above, outputs of the process circuit 205 are integrated at the integration circuit 260 after being masked, and after a sample holding at a rise of the VD signal shown in FIG. 10 the integration circuit 260 is reset at a trailing edge of the VD signal. Also, during a period of time when the control output X4 has a low level and the AE lock is done, the sample-and-hold circuit 261 will be placed in a hold state.

According to this embodiment, a light metering mode can be changed over with a simple arrangement. Also, since the light metering mode is changed over to a center spot light metering along with an AE lock, the light metering value does not have to be locked in a state as coming close to a specific object as in a conventional silver salt photo-taking camera.

That is, when an AE lock is done, for example, when an AE lock button is pressed with a person, under rear light positioned at the center of a view finder, the diaphragm is automatically stopped down, and a center spot light metering value under said state and a gain of the AGC are memorized, thus an AE lock does not have to be made by coming close to the person. Also, since the change-over to such control spot light metering along with an AE lock is made automatically along with the AE lock, operations can be made very easily.

While the change-over is made to a center spot light metering mode (a mode in which the output of a center portion only) such as shown in FIG. 13(a) is used for light metering along with an AE lock, it may be a center-weighted light metering instead of a center spot light metering.

As has been explained above, according to the fourth embodiment of the present invention, exposure control information is memorized by light metering means having a wider dynamic range than that of image pick-up means before an exposure control by a diaphragm, etc., is made, then an aperture is directly changed to such value as corresponding to the above-mentioned exposure control information along with the start of driving of a diaphragm, then the aperture is corrected by an output of the image pick-up means. Therefore, the control of a diaphragm can be made very accurately, yet the response is very fast. Also, since the second memory means, to memorize an output of the image pick-up means under a finally corrected aperture state, is provided, it will be very advantageous for making an AE lock. That is, AE lock information can be obtained quickly, and the AE lock information will be of high accuracy. Further as the second memory means is provided, the diaphragm can be placed in a fully opened state, which results in a number of advantages that determination of a composition for actually carrying out the image pick-up and the focus adjustment can be done easily.

Next, a fifth embodiment of the present invention will be described. The image pick up apparatus in the fifth embodiment has both photographing modes for a still picture and a moving picture, and an arrangement of an optical system thereof is same as that shown in FIG. 1. An example of a circuit suitable for control of the fifth embodiment is shown in FIG. 14.

Figure 14:
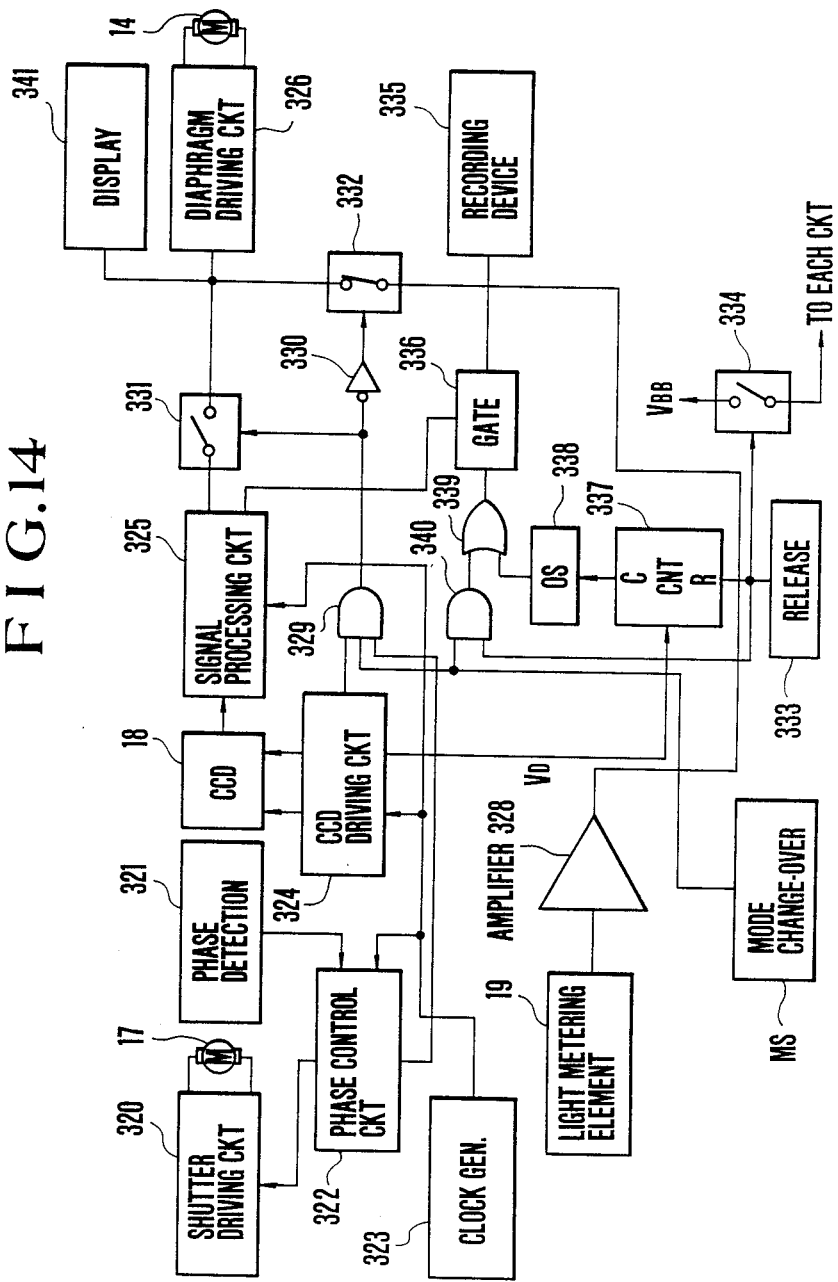
FIG. 14 is a control circuit diagram for a fifth embodiment of the present invention.

In FIG. 14, 320 is a shutter driving circuit, 321 is a phase detection circuit for the motor 17, and 322 is a phase control circuit. In addition, 323 is a clock generator, 324 is a CCD driving circuit, 325 is a signal processing circuit, 326 is a diaphragm driving circuit to control the diaphragm motor 14, and 328 is an amplifier, while 329 is an AND gate, and 331, 332 are analog switches.

Further, MS is a mode change-over circuit as control means for changing over a still photo-taking and a continuous (movie) photo-taking, wherein a low level signal is produced in the case of still and a high level signal is produced in a case of the movie.

333 is a release circuit for a photo-taking. The release circuit 333 produces a high level signal by pressing an operation button (not shown).

When the high level signal is produced from the release circuit, a power source switch 334 is made ON for supplying power to each circuit.

Also, 335 is a recording device and is an an example something like a magnetic disk or a VTR. 336 is a gate to introduce an output of the signal processing circuit 325 into the recording device and to shut off the same, wherein the gate guides the output corresponding to one frame of the signal processing circuit 325 with such timing as defined by a counter 337 in a still mode.

Further, the vertical synchronizing signal VD from the CCD driving circuit is introduced into the counter 337, and when the signal VS is counted to a prescribed preset value after the count value is once reset by the high level output of the release circuit 333, pulses are produced from a carry C of the counter, when a one-shot circuit 338 opens the gate 336 for one V(vertical scanning) period of two V periods in synchronism with the pulses.

In the movie mode, the gate is opened through an AND gate 340 and on OR gate 339 for a period of time during which a high level signal is produced out of the release circuit.

Element 341 is a light metering information display circuit to display light metering values, etc., with 7-segments display and so forth.

Next the operation of the circuit shown in FIG. 14 will be explained in reference to a timing chart shown in FIG. 15. When a movie mode is selected by the mode change-over circuit MS and a release signal of high level is produced out of the release circuit 333, the power source is turned on by the power source switch 334 for supplying power to each part of FIG. 14. Output clocks of the clock generator 323 are supplied to the phase control circuit 322, the CCD driving circuit 324, and the signal processing circuit 325. The phase control circuit 322 sends a phase error signal to the shutter driving circuit 320 by an output signal of the phase detection circuit 321 and an output clock of the clock generator 323 for controlling a phase of the motor 17, and at the same time, when the phase matches, produces a phase clock signal (FIG. 15(e)) at one of input terminals of the AND gate 329.

Also, the CCD driving circuit 324 sends, to the CCD 18, a signal for instructing the image pick-up of the CCD 18 to store an image pick-up potential, a vertical transfer clock (FIG. 15(b)), and a horizontal transfer clock (FIG. 15(c)) for reading out an image pick-up potential. In addition, it sends unnecessary electric potential of the image pick-up part to the store part during a time period, T1 to T2, by the vertical transfer clock, and sends out the same to the outside by the horizontal transfer clock. Further, when the clearance of the unnecessary electric potential is completed and a next read-out by the horizontal transfer clock is started, the driving circuit 324 introduces a clearance completion signal (FIG. 15(d)) into the other input terminal of the AND gate 329. The output signal (FIG. 15(f)) of the AND gate 329 has a high level due to the presence of both outputs of the clearance completion signal and of the above-mentioned phase lock signal.

Therefore, before that, the analog switch 322 is closed by an output of the inverter 330, and a light metering element 19 being amplified by the amplifier 328 is transmitted to the diaphragm driving circuit 326 for controlling the aperture area of the diaphragm.

And when the output signal of the AND gate 329 becomes a high level, the switch 322 is opened while the switch 331 is closed. Then the output of the CCD 18 is transmitted through the signal processing circuit 325 to the diaphragm driving circuit 326, and an aperture diameter of the diaphragm is controlled by an output of the image pick-up means itself, and, at the same time, an integrated value for each 1 field of the output of the CCD 18 is displayed, after having a suitable operation done thereon, as a light metered value.

Also, the signal processing circuit 325 contains, besides such integration of the CCD output as mentioned, a sample-and-hold circuit to make a sample-and-hold of dot sequence signals from the CCD, respectively, with prescribed timings, a filter circuit to take out a signal element at a prescribed frequency band, various kinds of correction circuits, and an encoder, etc., and video signals obtained through these circuits will be guided to the recording device 325 during a period of time while the release circuit produces high level signals, as the output of the mode change-over circuit is at a high level in a movie mode.

Since a diaphragm aperture is controlled beforehand to a value close to an accurate one by another light metering means other than the image pick-up means before such image pick-up means, as CCD, etc., and a shutter, etc. function normally in a movie mode as has been explained, the amount of control of the diaphragm by an output of the image pick-up means can be reduced, therefore, the control time can be remarkably shortened. Further, as the diaphragm is controlled finally by using an output of the image pick-up means, an exposure control with a very high level of accuracy can be made.

Also, an output of the signal processing circuit 325 may be of a type producing a voltage such as one proportional to a value of sum of weighted potential values of each picture element in one picture frame, and in this case, an averaged light metering, a center-weighted light metering and a localized light metering, etc., can be made depending on the manner of weighting.

When a still mode is selected by the mode change-over circuit MS, the AND gates 329, 340 will be closed. Therefore, the switch 331 is opened while the switch 332 is closed.

By this, the diaphragm driving circuit 326 functions based on light metering information obtained by the light metering element 19 immediately after a high level signal is produced from the release circuit and the diaphragm is controlled to such aperture value as corresponding to an object brightness, and, at the same time, an output of the light metering circuit 19 is displayed by the display circuit 341 after having a suitable operation done thereon.

Also, the counter 337 is reset by an output of the release circuit 333, and after that, a prescribed number of VD pulses are counted when the one-shot circuit 328 produces a high level output for one picture element (1 field or 1 frame) by a carry output of the counter 337.

Therefore, one picture element out of read-out outputs from the CCD 18 will be recorded by a release signal from the release circuit 333 after elapse of time necessary for diaphragm control corresponding to light metering information by the light metering element 19, that is a period of time taking into consideration responsive characteristics of the light metering element and of the diaphragm.

Also, while this embodiment employs a counter to count the VD signals for making a compensation for rise times of such light metering element and diaphragm as mentioned above, for example, such arrangement may be employed that the gate 336 is opened in synchronization with a timer which produces a high level signal after elapse of a prescribed length of time in response to a release signal and of the VD signal.

Also, while diaphragm blades 11, etc., are used as diaphragm means in this embodiment, a physical type of aperture control means may be used as a matter of course.

Further, while this embodiment supplies power to each circuit on the high level output of the release circuit 333, such arrangement may be employed that power is first supplied to the shutter driving circuit 320, the phase control circuit 322, the clock generator 323, the diaphragm driving circuit 326, and the amplifier 328, and then, after a phase lock signal is obtained, power is supplied to the CCD driving circuit 324 and the signal processing circuit 325 in a movie mode.

This is because the length of time required for a phase control of a shutter is by far longer than the length of time required for clearance of the CCD 18, and such arrangement as mentioned above can eliminate wasteful consumption of power.

Also, while the light metering means is changed over by using a phase lock signal and a clearance completion signal in a movie mode of this embodiment, the change-over of the same may be done by using an output of a timer circuit which takes the length of time required for completion of clearance of the phase lock and the CCD 18. Also, when the store time of the CCD 18 is controlled, shutter means does not have to be used, and light metering means can be controlled only by a completion signal of clearance of CCD 18, etc., or only by detecting that a heater has been sufficiently heated up when an image pick-up tube is used.

While light metering is done by using a half-mirror in this embodiment, a light metering element may be positioned in front of the diaphragm.

While a CCD of a frame transfer type is used as image pick-up means, other types of solid image pick-up element or an image pick-up tube, etc., may be used.

As has been described above, the fifth embodiment of the present invention employs, in an image pick-up apparatus having a still mode and a movie mode, two kinds of means for light metering corresponding to these two modes, that is light metering means having good response characteristics in the still mode and an output of the image pick-up means in the movie mode, so that an opportune shooting (shutter) chance will not be missed in the still mode, and, as a light metering with a stopped down aperture is made in the movie mode, an accurate light metering and exposure control can be made.

As has been explained above, since the image pick-up apparatus according to the present invention makes exposure control using both an image pick-up output image pick-up means itself and a light metering output of another light metering means other than the image pick-up means, there are a number of advantages. For example, by making a dynamic range of the light metering means wider than that of the image pick-up means, a so-called fully opened aperture light metering, that is making a light metering with a diaphragm being kept in a fully opened state, can be made, which is advantageous when an optical view finder is used. Also, by controlling the diaphragm aperture by an image pick-up output after the diaphragm is controlled with a light metering value of the light metering means, more accurate and faster control of an aperture value can be made. Also, in a still photo-taking mode, light metering means with fast response characteristics is used so that an opportune shooting (shutter) chance will not be missed, and in a movie photo-taking mode an image pick-up output is used so that accurate light metering and exposure control can be made.

The present invention is not limited to the embodiments mentioned above, but various applications and modifications can be made therewith within the scope of the present invention.

What we claim:

1. An image pick-up apparatus, comprising:
   image pick-up means for converting an object image into an electrical signal;
   light metering means other than said image pick-up means for detecting a brightness of the object image; and
   exposure control means for controlling an exposure condition of said image pick-up means in response to a sequential output of said light metering means and said image pick-up means.

2. An image pick-up apparatus according to claim 1, wherein the exposure control means controls the exposure condition with the output of the light metering means, then thereafter controls said exposure condition with the output of the image pick-up means.

3. An image pick-up apparatus according to claim 1, wherein the exposure control means has memory means for memorizing a light metering value obtained by the light metering means and controls the exposure condition based on a memorized value by said memory means and the image pick-up output of the image pick-up means.

4. An image pick-up apparatus according to claim 3, further comprising second memory means for memorizing the exposure condition being controlled by the exposure control means.

5. An image pick-up apparatus according to claim 1, which further comprises selection means for selecting a still photo-taking mode and a moving photo-taking mode, wherein when the still photo-taking mode is selected the exposure control means controls the exposure condition by the light metering output of the light metering means, and when the moving photo-taking mode is selected, the exposure control means controls the exposure condition by at least the light metering output of the image pick-up means.

6. An image pick-up apparatus according to claim 3, further comprising an optical view finder.

7. An image pick-up apparatus, comprising:
   image pick-up means for converting an object image into electrical signals;
   light metering means other than said image pick-up means for detecting a brightness of the object image;
   instructing means for instructing the image pick-up means to pick up an image; and
   control means for controlling an exposure condition of said image pick-up means with an output of the light metering means and then controlling the exposure condition with an output of the image pick-up means based on the instructions from the instructing means.

8. An image pick-up apparatus according to claim 7, wherein the image pick-up means includes a solid image pick-up element, and the control means controls the exposure condition by an output of the image pick-up means after unnecessary electric charge within the solid image pick-up element has been cleared.

9. An image pick-up apparatus according to claim 7, wherein said control means comprises shutter means for blocking light from an object from being irradiated onto the image pick-up means.

10. An image pick-up apparatus according to claim 9, wherein the shutter means comprises a rotary shutter and a driving motor.

11. An image pick-up apparatus according to claim 10, further comprising phase detection means for detecting a rotating phase of the rotary shutter, wherein the control means controls the exposure condition by an output of the image pick-up means after the phase detection means detects that the rotating phase has been stabilized.

12. An image pick-up apparatus, comprising:
   image pick-up means for converting an object image into an electrical signal;
   light metering means provided separately from the image pick-up means for metering light from the object;
   memory means for memorizing information sensed by the light metering means; and
   control means for controlling an exposure condition based on said information memorized by the memory means and the electrical signals obtained from the image pick-up means.

13. An image pick-up apparatus according to claim 12, further comprising a reflection member provided on an optical path from the object to the image pick-up means and an optical view finder to visually recognize the object through said reflection member.

14. An image pick-up apparatus according to claim 13, further comprising diaphragm means between the reflection member and the object, and the light metering means detects intensity of object light coming through the diaphragm means.

15. An image pick-up apparatus according to claim 14, wherein the light metering means makes light metering when the diaphragm means is maintained at a fully opened state, and the memory means memorizes the light metering value of that time.

16. An image pick-up apparatus according to claim 15, wherein the control means controls driving of the diaphragm means with the light metering value memorized in the memory means, then thereafter controls the exposure condition by an output of the image pick-up means.

17. An image pick-up apparatus according to claim 16, wherein the control means returns the diaphragm means to a fully opened state after outputs of the image pick-up means are recorded.

18. An image pick-up apparatus, comprising:
   image pick-up means for converting an object image into an electrical signal;
   exposure means for limiting an amount of light incident into said image pick-up means;

light metering means provided separately from the image pick-up means for metering light from an object;

exposure control means for controlling the exposure means based on the light metering information sensed by the light metering means and the electrical signals obtained from the image pick-up means; and memory means for memorizing an exposure information of the exposure means controlled by said diaphragm control means.

19. An image pick-up apparatus according to claim 18, further comprising photo-taking instructions means for giving an instruction to take a photo, and memorizing instruction means for giving an instruction to the memory means to operate before said instruction to take a photo.

20. An image pick-up apparatus according to claim 19, wherein the diaphragm control means sets the diaphragm means at the exposure information memorized within the memory means at the time an instruction is issued by the photo-taking instruction means.

21. An image pick-up apparatus according to claim 20, further comprising a reflection member provided on an optical path from the object to the image pick-up means, and an optical view finder to visually recognize said object through said reflection member.

22. An image pick-up apparatus according to claim 21, wherein the exposure means is provided between the reflection member and the object, and the light metering means detects intensity of object light passing through the exposure means.

23. An image pick-up apparatus according to claim 22, wherein the light metering means makes a light metering when the exposure means is maintained at a fully opened state.

24. An image pick-up apparatus, comprising:

image pick-up means for converting an object image into an electrical signal;

exposure means for limiting an amount of light incident into said image pick-up means;

light metering means having faster responsive characteristic than that of the image pick-up means and for metering light from the object; and control means for effecting the light metering by the light metering means in case that a still picture is picked up by the image pick-up means and effecting the light metering based on at least an output of the image pick-up means in case that a moving picture is picked up by the image pick-up means.

25. An image pick-up apparatus according to claim 24, further comprising selection means for selecting a photo-taking mode for a still picture and a photo-taking mode for a moving picture.

26. An image pick-up apparatus, comprising:

(a) an image sensor for converting an image of an object into an electrical signal;

(b) light receiving means for detecting the light of the object, said light receiving means having a characteristic different from that of the image sensor; and (c) exposure control means for controlling an exposure condition of said image sensor in correspondence to a sequential output of said light receiving means and image sensor.

27. An image pick-up apparatus according to claim 26, wherein said exposure control means includes a diaphragm.

28. An image pick-up apparatus according to claim 26, which further comprises change-over means for selectively applying outputs of said light receiving means and said image sensor to the exposure control means.

29. An image pick-up apparatus according to claim 28, wherein said change-over means performs change-over operations along with the initiation of an image pick-up operation by said image sensor.

30. An image pick-up apparatus according to claim 29, wherein said change-over means changes the signal applied to said exposure control means from the output of said light receiving means to the output of said image sensor along with the initiation of the image pick-up operation by said image sensor.

31. An image pick-up apparatus, comprising:

first light sensitive means for converting an object to an electrical signal;

second light sensitive means for detecting the brightness of the object, said second light sensitive means having a detecting characteristic different from that of said first light sensitive means; and exposure control means for controlling an exposure condition of said first light sensitive means in correspondence with one of said light sensitive means, and then with the other of said light sensitive means.

32. An image pick-up apparatus as in claim 31, wherein said exposure control means includes means for controlling the amount of light on said first light sensitive means in response to both of said light sensitive means.

33. An image pick-up apparatus as in claim 31, wherein said exposure control means includes means for controlling the amount of light on said first light sensitive means in response to said second light sensitive means and then said first light sensitive means in sequence.

34. An image pick-up apparatus as in claim 31, wherein said exposure control means includes a controller for controlling light on said first light sensitive means and switching means for selectively coupling said first and second light sensitive means to said controller.

35. An image pick-up apparatus as in claim 34, wherein said first light sensitive means includes an image sensor and means for initiating an image pick-up operation for recording in said sensor, and said switching means serves for switching the coupling of said controller from said second light sensitive means to said first light sensitive means along with initiation of said image pick-up operation for recording in said sensor.

36. An image pick-up apparatus as in claim 31, wherein said first light sensitive means includes a diaphragm.

37. An image pick-up apparatus, comprising:

(a) image pick-up means for sensing an object image and converting said object image into an electrical signal;

(b) photo-sensing means for sensing a light condition of an object image, said photo-sensing means having sensing characteristics different from those of said image pick-up means; and (c) control means for controlling the light condition of said object image relative to said image pick-up means by utilizing outputs of both said photo-sensing means and said image pick-up means.

38. An apparatus according to claim 37, wherein said control means controls the condition of said object image by controlling an exposure condition of said object image relative to said image pick-up means.

39. An apparatus according to claim 38, wherein said control means includes a diaphragm.

40. An apparatus according to claim 37, wherein said control means utilizes the outputs of both said photo-sensing means and said image pick-up means in sequence.

41. An apparatus according to claim 40, wherein a said control means utilizes the output of said photo-sensing means first and then the output of said image pick-up means.

42. An apparatus according to claim 40, which further includes means for recording the output of said image pick-up means.

43. An apparatus according to claim 42, wherein said control means utilizes the output of said photo-sensing means and then the output of said image pick-up means to form a signal for controlling the condition of said object image relative to said image pick-up means in a process for recording a predetermined output of said image pick-up means by said recording means.

44. An image pick-up apparatus, comprising:
(a) image pick-up means having first light sensitive means for detecting an image of an object and generating an electrical signal;
(b) second light sensitive means for detecting a light condition of the object, said second light sensitive means having a detecting characteristic different from that of said first light sensitive means; and
(c) control means for controlling said image pick-up means to generate a predetermined electrical image signal in response to one and then the other of said light sensitive means in sequence.

45. An apparatus according to claim 44, wherein said control means includes means for controlling the image pick-up means in response to said second light sensitive means and then said first light sensitive means in sequence.

46. An apparatus according to claim 44, wherein said control means generates said predetermined electrical signal by controlling an exposure condition relative to said first light sensitive means.

47. An apparatus according to claim 46, wherein said image pick-up means includes a diaphragm and/or a shutter.

48. An apparatus according to claim 44, which further includes means for recording the output of said image pick-up means.

49. An apparatus according to claim 48, wherein said control means controls first the image pick-up means by an output of said second light sensitive means and then controls the image pick-up means by an output of said first light sensing means in a process for recording the predetermined electrical image signal of said image pick-up means by said recording means.

50. An apparatus according to claim 1, 7 or 12, wherein said exposure condition includes a period for a converting operation of said image pick-up means.

51. An apparatus according to claim 18 or 24, wherein said exposure means includes means for controlling a period for a converting operation of said image pick-up means.

52. An apparatus according to claim 26, wherein said exposure condition includes a period for a converting operation of said image sensor.

53. An apparatus according to claim 31, wherein said exposure condition includes a period for a converting operation of said first light sensitive means.

54. An apparatus according to claim 37, wherein said light condition of said object image includes a period for a converting operation of said image pick-up means.

55. An apparatus according to claim 44, wherein said control means is able to control a period for generating the electrical signal in said first light sensitive means so as to generate said predetermined electrical image signal.

56. An apparatus according to claim 26, wherein said light receiving mean has a wider dynamic range of characteristics than that of said image sensor.

57. An apparatus according to claim 26, wherein said light receiving means has faster responsive characteristics than that of said image sensor.

58. An apparatus according to claim 31 or 44, wherein said second light sensitive means has a wider dynamic range of characteristics than that of said first light sensitive means.

59. An apparatus according to claim 37, wherein said photo-sensing means has a wider dynamic range of characteristics than that of said image pick-up means.

60. An apparatus according to claim 37, wherein said photo-sensing means has faster responsive characteristics than that of said image pick-up means.

* * * * *